Aug. 23, 1949.  D. WEISZ  2,479,655
SEPARABLE AIRPLANE FOR SAFE FLYING
Filed Nov. 7, 1946  2 Sheets-Sheet 1
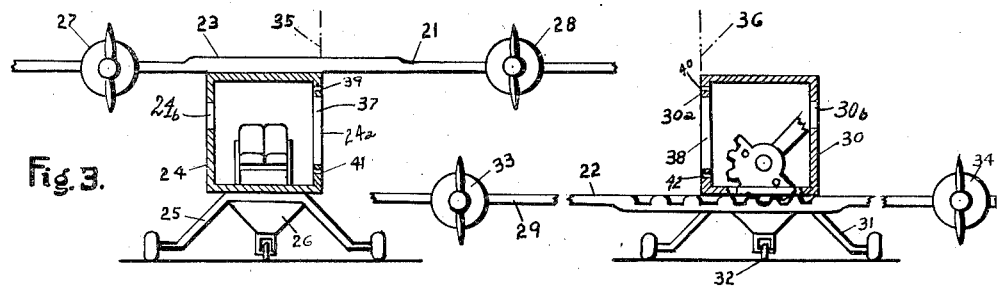
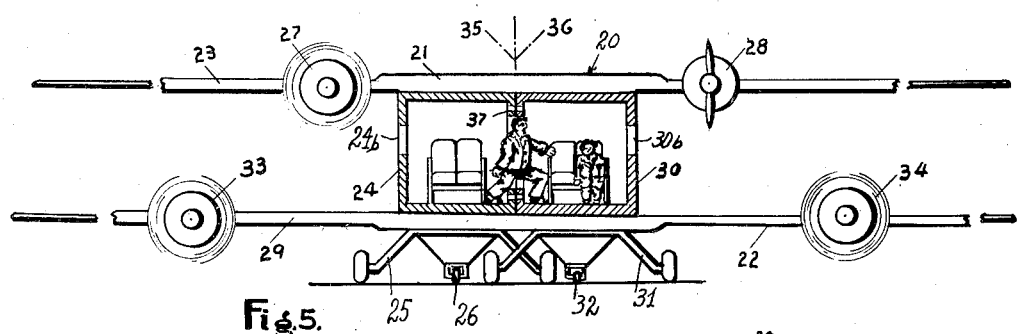
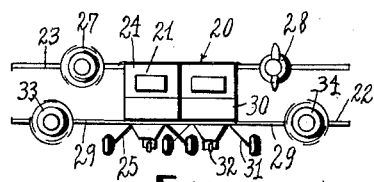
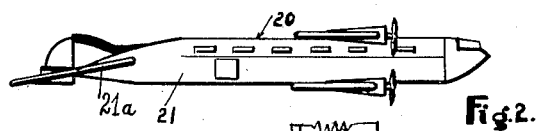
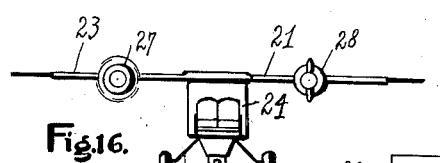
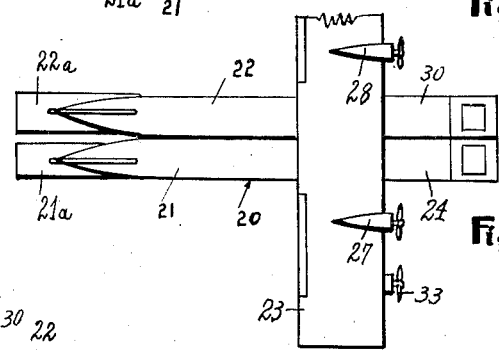
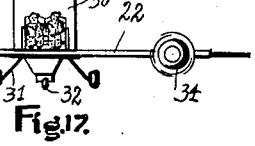
INVENTOR:
DAVE WEISZ,
BY: Julius J. Wittal
his attorney.

Aug. 23, 1949.   D. WEISZ   2,479,655
SEPARABLE AIRPLANE FOR SAFE FLYING
Filed Nov. 7, 1946   2 Sheets-Sheet 2
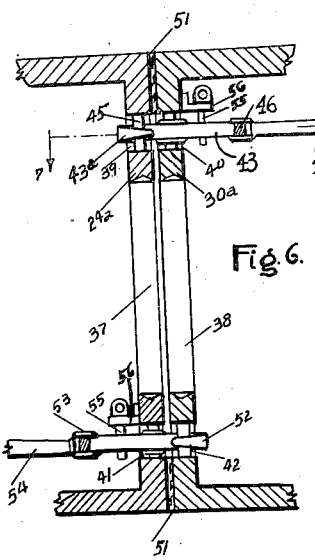
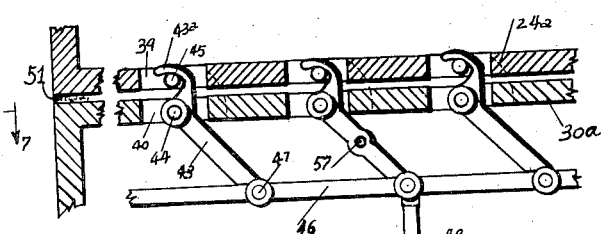
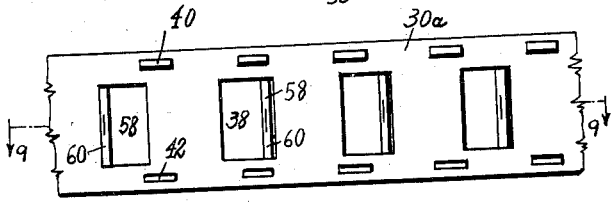
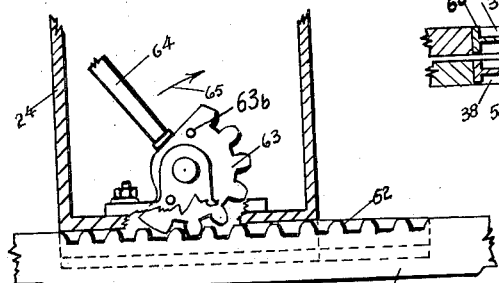
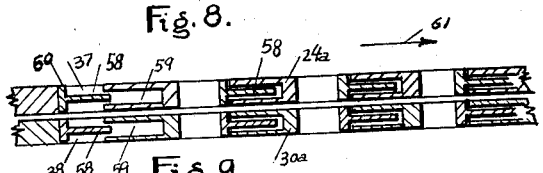
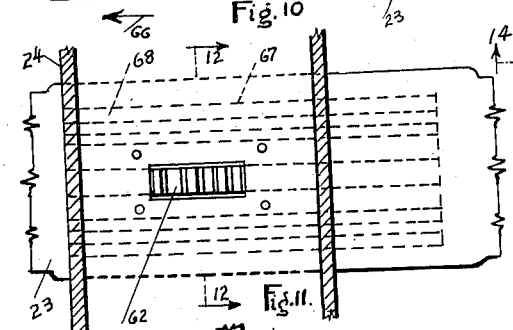
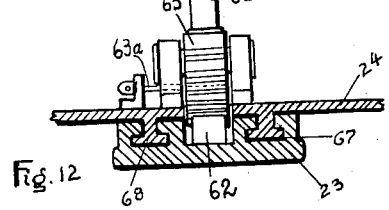
DAVE WEISZ,
INVENTOR.
BY: Julian J. Wittal
his attorney.

Patented Aug. 23, 1949

2,479,655

UNITED STATES PATENT OFFICE 2,479,655

SEPARABLE AIRPLANE FOR SAFE FLYING

Dave Weisz, New York, N. Y.

Application November 7, 1946, Serial No. 708,257

7 Claims. (Cl. 244—2)

This invention relates to air craft, particularly heavier than air flying machines, and has for its main object to provide an aircraft in which there will be separable parts temporarily connected when flying, and each part will be adapted to fly alone when any damage or accident happens to the other part, thereby greatly enhancing the safety of flying of such combination aircraft.

Particularly, my invention relates to airplanes, and has for its main object to provide two airplanes, each with a single wing, which airplanes may be quickly and easily secured together into a double decker or two winged airplane, or may then be separated with the same ease and quickness, when either of single airplanes will be adapted to fly alone.

Another object of my invention is to provide an upper and a lower wing single decker airplane, which will be practically identical, having the same weight, and well balanced, with the exception of having oppositely placed wings and fuselages, and having said fuselages secured to one another with the mentioned quickly operable or disconnectable means, and also having quick and easy facilities, whereby all the crew, passengers and load from one fuselage may be transferred into the other one, and whereupon the emptied fuselage may be separated from the loaded one and abandoned, while the loaded one may carry all the weight alone and safely fly on. In this manner, if either one of the component airplanes is damaged while flying, the undamaged one can continue in flight, and save all the passengers and load.

Still a further object of this invention is to provide a double decker combination airplane, composed of two single airplanes, wherein the fuselages are temporarily secured to one another in an air and water tight but quickly separable manner, wherein registering door openings are provided in the adjacent walls of the fuselages, thereby allowing the passengers and load in one fuselage to be quickly transferred into the other one, but wherein doors are provided for such openings which may be quickly and easily closed after the separation of the fuselages, and wherein such doors will have a tendency to automatically close by the action of the air stream caused by the flying of the separated single airplane.

Still a further object of my invention is to provide a double decker combination airplane, composed of two single decker airplanes, wherein the fuselages are secured to one another, and wherein, normally, the two fuselages are out of the center line, to make them balance, but wherein means are provided that, upon separation, the fuselage of the separated single airplane will be quickly and easily moved in the center thereof, balancing when flying alone.

Still another object of my invention is to provide two single decker airplanes and means to comprise them into one double decker, said means being easily and quickly separable, and as easily and quickly releasable, whereby either part of the double decker airplane may keep on flying as a single airplane, and to provide means to extend the wing spread of either of the single airplanes when the same is to be flown alone, so as to enable it to carry the combined load of the two airplanes when two wings were carrying it.

Still further objects of this invention will be partly apparent as the specification of the same proceeds, or will be partly pointed out therein, and, among others, I may mention: to provide a safe separable aircraft, as indicated hereinbefore, which will be neat in appearance, simple in construction, and easy in use.

It will be seen that I provide a combination double decker airplane, composed of two single wing airplanes, which will attain all the objects of this invention, as indicated hereinbefore. It also be will be seen that, while preferably the crew will operate the devices for securing together and separating the two fuselages, the passengers or anybody else may do the same in an emergency, very quickly and easily. In the embodiment shown, such a connection or disconnection may be executed simply by the throwing of one cam action lever.

My double decker combination airplane will insure greater safety to flying than is the case at present, since, even if parachutes are provided in a flying machine used at present, many people are not able to skillfully use the parachute, particularly children, old and sick people, the descent by a parachute is always connected with various chances and accidents, and, finally, a great percentage of the damage, injury, and accidents occurring in flying machines, are such that no parachutes could be used, while in most of these cases, my invention will provide safety for the passengers and even for the load.

The damaged plane of my invention sometimes will simply be dropped, or it also may land easier because there is no load in it, and may be saved and repaired. A pilot may volunteer to operate it.

In the drawings forming a part of this specification, and accompanying the same:

Fig. 1 is a diagrammatical plan view of my separable double airplane, portions of the same being broken away, and Fig. 2 is a side view thereof;

Fig. 3 is a front elevational view, partly in section, of one of the two units which make up my separable combination double airplane, showing the unit with an overhead wing, and Fig. 4 is a similar front elevational view of the other unit in my double airplane, this being shown as having a low wing;

Fig. 5 is a partly sectional diagrammatical front view of the two airplanes secured together, and forming my double separable airplane;

Fig. 6 is a fragmentary sectional view through the adjacent walls of the two airplane units, separably interconnected, and Fig. 7 is a horizontal sectional view therethrough, the section being taken on the line 7—7 of Fig. 6;

Fig. 8 is a fragmentary elevational view of one of the adjacent walls in my two airplane units, their securing means having been removed for clearness of showing, and Fig. 9 is a fragmentary sectional view of said two walls, the section being taken about on the line 9—9 of Fig. 8;

Fig. 10 is a fragmentary sectional view of the mechanism to move the wings in the two units of my airplane to central balanced positions, when the two units are separated from one another, or when they are to be secured together;

Fig. 11 is a plan view thereof, portions of the same having been removed, and

Fig. 12 is a sectional view showing the sliding interconnection between the fuselage of a unit airplane in my double combination airplane, and the mechanism to move the wing with reference to the fuselage thereon, the section being taken on the line 12—12 of Fig. 11;

Fig. 13 indicates in a diagrammatical manner an extension mechanism for the wing of my airplane, and Fig. 14 is a sectional view thereof, the section being taken on the line 14—14 of Fig. 13;

Fig. 15 is a diagrammatical view of my double decker airplane before separating the two single ones, because one engine stopped;

Fig. 16 shows the damaged single airplane separated and abandoned;

Fig. 17 is a view of the undamaged airplane loaded with passengers from both single units.

Referring now to the drawings more in detail, by characters of reference, the numeral 20 indicates my double separable airplane for safe flying, in general, being composed of a left hand unit thereof in the form of a single airplane, indicated generally by the numeral 21, and a right hand such unit or single airplane 22. The left hand unit 21 is indicated somewhat more in detail, but still diagrammatically and in a front elevation in Fig. 3, and the right hand unit 22 is similarly shown in Fig. 4, and it will be seen that the left hand unit has an upper wing 23, a fuselage 24 suspended therefrom, a front undercarriage or landing gear 25, and a rear landing gear 26. Two engines 27 and 28, arranged in the wing 23, are shown, for driving said left hand unit airplane.

The right hand unit 22 (Fig. 4) has a lower wing 29, a fuselage 30 supported thereon, a front undercarriage 31, a rear undercarriage or landing gear 32, and also has two engines 33 and 34 in its wing 29 for motive power.

It will be seen that the fuselage or body 24 of the left hand airplane is to the left of the center line 35 thereof, while the fuselage or body 30 of the right hand unit is at the right side of its center line 36.

Now, according to my invention, the two unit airplanes 21 and 22 will be secured together in an easily releasable but still safe and reliable manner, so that in such as position, the two units will form a single double winged or double decker airplane, as indicated in Fig. 5. For this purpose, the inner wall 24a of the left hand fuselage 24 will be placed against the inner wall 30a of the fuselage 30 of the right hand unit airplane 22, and the two adjacent walls will be secured to one another in such a position, by easily operated, quick, but still strong, reliable means, said means having the character of being releasable in the same easy and quick manner.

It will be seen that I produce a double decker airplane having two fuselages side by side, and closely attached to one another, secured together in a temporary though reliable and quickly releasable manner. I preferably provide door openings 37 in the wall 24a of the left hand unit, and similar registering door openings 38 in the wall 30a of the right hand fuselage 30. These door openings, normally, will be kept unobstructed, so that the occupants of one airplane unit may easily and quickly step over through the door openings from one into the other, when desired, and the basic conception of my invention is that normally, and in the overwhelming majority of the cases, an accident or damage will be done only to one unit of the two, from which then the occupants may quickly move into the adjacent intact unit, whereupon the two units may be separated, and the intact unit may keep on flying with its double freight, and save the people.

In a word, it is as if the occupants of my separable double airplane would have a choice all the time between the two airplanes in which to continue the travelling, and since the chances that both airplanes will be damaged at the same time are infinitely smaller than the chances that one of them may be damaged, the safety of the occupants is many times greater than if they could rely upon only one single airplane in which they travel, as is the case at present.

In Figs. 6 and 7 I show one form for the quick securing of the two airplane units to one another, or releasing them in a similar manner.

As will be seen, in said figures, the numeral 24a indicates the inner wall of the left hand airplane unit, and 30a the inner wall of the right hand unit, while the numerals 37 and 38 indicate the respective co-operating door openings, Fig. 6 showing them with the doors removed.

Registering upper openings 39 and 40, and lower openings 41 and 42, are arranged in the walls 24a and 30a, respectively, and a cam action hinged lever 43 is pivoted in each opening 40, as at 44, while a pin 45 is firmly secured in the center of every opening 39. A cam action hook device 43a is at the inner end of the pivoted lever 43, while the outer branch of the lever is pivotally connected into an operating rod 46, as at 47.

As has been mentioned, every registering pair of openings 39 and 40 will have such a pivoted lever arranged therein, all the levers being pivoted in the operating rod 46, and a handle 48 is secured at an appropriate place on the operating rod 46, by which the same may be moved in a right hand direction, as indicated by the arrow 49, or a left hand direction, as shown by arrow 50.

It will be seen that, when the handle 48 and the operating rod 46 therewith, are moved in a right hand direction, arrow 49, all the cam action hooks 43a will tightly and securely engage the respective pins 45, and obviously said cam action will cause the adjacent walls 24a and 30a to be drawn close to one another.

To make the connection between the two airplane bodies or fuselages more airtight and watertight, I may interpose a sealing material, indicated at 51, between the two walls, as will be understood by those versed in this art.

For the lower openings 41 and 42, similar cam action hook levers 52 may be arranged, pivoted in a longitudinal rod 53, and provided with the operating handle 54. To secure the two fuselages in such connected position, I may also employ a locking pin 55 for each operating rod systems 46 and 53, respectively, said pin being dropped through an appropriate hole in a stationary part 56 on the respective fuselage wall, and then inserted into an aperture 57 in the pivot levers 43 and 52, respectively. When it is desired to remove these locking means, and separate the two fuselages, pins 55 will be pulled out from the aperture in the stationary member 56 and the aperture 57 in the respective pivot lever, and thereby permit the opening movement of all said levers.

In Figs. 8 and 9 I indicate one preferred form of doors employed in said openings 37 and 38, so that when the separation of the two airplane units has been completed, the one keeping on flying can be closed and sealed at the open side, by moving the doors into closure positions, and locking them in such a position. I preferably employ sliding doors 58 to close the respective door openings 37 and 38, or to release them by sliding into appropriate spaces 59 in the respective walls 24a and 30a. The same precautions may be resorted to with the plane to be abandoned.

In Figs. 8 and 9 some of the doors are shown in a closed, and others in an open, position. I also may provide T-shaped heads 60 for the sliding door, the under portion of the head of the T being arranged against the air stream, so that the doors will be automatically closed and kept closed when flying the unit, even if the other mechanical means for the said purpose are not used. For this effect the direction of the flying of the airplane is imagined as indicated by the arrow 61.

When one of the units of my double airplane has been injured, and the intact unit is separated therefrom and is flown as a single decker airplane, the fuselage thereof must be moved to the right, in case of the left hand unit, or to the left, in the case of the right hand unit, so that the center line of the fuselage should now be at the centerline of the respective unit, for obvious balancing and flying reasons.

In Figs. 10 to 12 I show one form of construction, and means to accomplish this object. The arrangement here is shown for the left hand unit, but, of course, the identical construction will be employed for the right hand unit, only operating in a reverse direction.

In Figs. 10 to 12, the wing 23 is provided with a rack 62, which co-operates with a tooth segment 63, rotatably secured in the fuselage 24, and operable by the handle 64. It will be seen that if the handle 64 is moved in the right hand direction, arrow 65, wing 23 will be moved to the left, arrow 66, and the fuselage 24 may this way be placed on the center line of the wing. In Fig. 12 I show one form of sliding interconnection between the wing 23 and the fuselage 24, and it will be seen that according to this solution of the problem, the wing will have grooves 67, in which may slide the T rails 68 of the fuselage.

A releasable locking pin 63a may be used in co-operation with holes 63b to secure the toothed segment in either of its positions. It also will be obvious that when the load of a double decker airplane is moved into a single decker, the wing of the latter must have a larger spread, substantially the same as the spread of the two wings was before.

In Figs. 13 to 14, one solution of this problem is shown. According to this construction, a slidable extension 69 is arranged in the end of each wing, the drawing showing the right hand end of the wing 23. A coiled spring 70, normally withdraws the extension 69 into the wing 23, and keeps it in such a withdrawn position. When it is desired to extend the spread of the wing to a desired extent, cords 71, secured on the inner end of the wing extension 29, as at 72, will be pulled by the pilot inwardly, arrow 73, said cords passing through holes in the wing 23 and over pulleys 74. In this manner, obviously, the extension 69 will be moved outwardly to a desired distance.

If the wing spread is to be shortened, the cords 71 will be released and permitted to ride in a direction opposite to that indicated by the arrow 73, which they will do after such release through the influence of the spring 70, and the extension 69 will be withdrawn to the extent permitted by the outward movement of the cords 71.

In Figs. 3, 4 and 5, the numerals 24b and 30b indicate windows for the single airplanes. The circles in the showing of engines and propellers 27, 33 and 34 in Figs. 5, 15, 16 and 17 indicate that these engines and propellers are rotating in working order, while the full showing of the propeller at 28 indicates that that engine developed trouble, and this is the cause why the single airplane 21 is to be abandoned, and the airplane 22 will keep on flying.

I may mention that the undamaged plane may again be paired with an appropriate second plane, to replace the damaged one, and a new such double decker airplane produced with one half of the expense.

It also will be understood that the two single planes must be operated in harmony when they are connected into a double decker. This may be attained by various methods, well known to those versed in this art.

Also, when moving the fuselage in the airplane continuing the flight, the various electrical and other connections will be made in such a manner that they will not be changed by such comparatively small moving of the fuselage. In a word, such connections, like wiring, tubing, etc. will be made in a yielding and continuing manner, so that they will operate in any relative position between wing and fuselage within the limit of the movement of the wing against the fuselage. Such connection will be obvious to experts in airplane design.

It also may be noted that the elevator planes 21a and 22a of the single airplanes (Figs. 1 and 2) will be longer and narrower than usual in such planes. However, on account of their length, they will have the same surface as elevator planes as in a normal case. The reason for this alteration is obvious, and it is done to permit the securing together of the two fuselages without the elevator planes interfering with one another.

It also will be obvious that the openings for the securing means 39, 40, 41 and 42 will have to be closed when the airplanes fly singly. I also want to mention that in case of war, the occupants of the double safety airplane of my invention, will, in most cases, be able to keep on flying even if one-half of the double airplane will be damaged, and so avoid being taken prisoners of war.

The cost of manufacturing of my double airplane will not be very materially more than a single one, but the advantages accompanying its use will greatly outweigh the increasing cost, and ultimately, in case of accident, the cost will really be less than that of a single aircraft, since part of the machine can again be used. For the same reason, even if the passengers in such a double combination airplane may have to pay higher fare, the safety and the avoidance of accidents will make the higher fare really much lower than those charged at present. In a way I may say that with one single step, a passenger in my double airplane may avoid possibly fatal accidents, and step into another airplane which is still able to fly.

It also may be of advantage to provide guards at appropriate places for the propellers and engines of my single airplanes, such guards preferably being provided below the propellers of the upper wing and above the propellers of the lower wing, whereby the possibility of injury to the propeller of the undamaged airplane by parts or the propeller of the damaged one, will be avoided.

When my airplane flies as a single one with extended wing spread, after some such flight, the used up fuel will gradually reduce the weight, and the wing spread may again be reduced. At the same time, the speed may be increased.

It also will be obvious that the actual practical building of double decker safety airplanes composed of two single decker planes, according to my invention, will have many details not shown in my drawings, as further experimenting and actual trials will lead to most efficient solutions of the various detail problems, and so, while I have shown a preferred embodiment of my invention, it is to be understood that changes and variations may be resorted to in the elements, combinations and co-operations in my invention, and I reserve my rights to such changes and variations, as are within the spirit of this specification, and the scope of the claims hereunto appended.

What I claim as new, and want to protect by Letters Patent of the United States, is:

1. A composite biplane comprising two monoplanes, one monoplane having a high wing and a fuselage depending therefrom on the one side of its center, and the other monoplane having a low wing with a fuselage built thereon somewhat out of the center in the other direction, the two fuselages being constructed and arranged to be placed into a side by side relation, and means to quickly and easily secure the two fuselages to one another or to separate them.

2. In a composite biplane, as set forth in claim 1, registering openings in the adjacent walls of the fuselages, normally being open to permit a quick transfer of the passengers and load from one fuselage into the other, and doors in said openings adapted to be sealed and locked when the monoplanes are operated.

3. In a composite biplane, as set forth in claim 1, registering openings in the adjacent walls of the fuselages, normally being open to permit a quick transfer of the passengers and load from one fuselage into the other, and doors in said openings adapted to be sealed and locked when the monoplanes are operated, said doors being slidable, recesses in the walls for said doors, a transverse head on each door at the end thereof away from the direction of flight, whereby the air stream, when either monoplane is flying, will automatically move said door into a closed position.

4. In a composite biplane, as set forth in claim 1, said means to secure together or separate the two fuselages including a pair of registering openings in the adjacent walls of the two fuselages, a lever with a cam hook termination, pivoted on a member secured in one opening, a second member secured in the other opening, said termination being adapted to engage or disengage said second member, said lever having a branch projecting from said pivot into the fuselage of said first opening, whereby a moving of said projecting branch in one direction will hook said lever into said first member, and secure the two fuselages together, and a moving thereof in the other direction will release said member and release the two fuselages from one another.

5. In a composite biplane, as set forth in claim 1, said means to secure together or separate the two fuselages comprising a plurality of registering pairs of holes in the adjacent walls of the two fuselages, a lever with a cam hook termination pivoted on a member secured in one opening in each pair, a second member secured in the other opening, said hook termination being adapted to engage or disengage said second member, said lever having a branch projecting from said pivot into the fuselage of said first opening, whereby a moving of said projecting branch in one direction will hook said lever unto said second member and secure the two fuselages together, and a moving thereof in the other direction will release said second member and release the two fuselages from one another, an operating rod in said first fuselage, the projecting lever branches being pivotally secured to said rod, whereby a movement of said rod in one or the other direction will automatically operate all the levers.

6. In a composite biplane, as set forth in claim 1, means to move the respective fuselages in the monoplanes to center positions, when the single airplanes are separated.

7. In a composite biplane, as set forth in claim 1, means to move the respective fuselages in the monoplanes to center positions, when the single airplanes are separated, said means to move the fuselages consisting in co-operating sliding elements in the fuselage and the wing, respectively, a rack on the wing, a pivoted toothed segment for the same in the fuselage, and a handle on the segment whereby to turn the same in one or the other direction.

DAVE WEISZ.

REFERENCES CITED

The following references are of record in the file of this patent:

UNITED STATES PATENTS

| Number | Name | Date |
|---|---|---|
| 1,650,346 | Hall | Nov. 22, 1927 |
| 1,925,768 | Mayo | Sept. 5, 1933 |
| 2,062,599 | North | Dec. 1, 1936 |
| 2,308,764 | Makaroff | Jan. 19, 1943 |
| 2,399,217 | Fahrney | Apr. 30, 1946 |

FOREIGN PATENTS

| Number | Country | Date |
|---|---|---|
| 429,177 | France | July 10, 1911 |